United States Patent Office 3,649,571
Patented Mar. 14, 1972

3,649,571
CATIONICALLY DYEABLE POLYESTER
Max H. Keck, Cuyahoga Falls, Ohio, assignor to The Goodyear Tire & Rubber Company, Akron, Ohio
No Drawing. Filed June 1, 1970, Ser. No. 42,517
Int. Cl. C08g 17/06, 17/16; D06p 3/52
U.S. Cl. 260—22 D           10 Claims

ABSTRACT OF THE DISCLOSURE

Polyethylene terephthalate and its copolyesters are rendered cationically dyeable by incorporating in the polyester about 0.5 or 1.0 to 15.0 or 20.0 weight percent (preferably 3 to 7 weight percent) of the product of the reaction of dimer or trimer acid with the sodium salt of isethionic acid.

---

This invention relates to new materials for improving the dyeability of fibers and fabrics of polyester resins. More particularly the invention relates to treating the polyester from which the fibers are made during or after their preparation with the reaction product of dimer or trimer acid with the sodium salt of isethionic acid and to fibers and fabrics of the treated polymers.

The polyester resins useful in accordance with the present invention are cold drawable, linear, fiber forming, highly polymerized polyesters such as the polyesters derived from terephthalic acid and glycols of the formula $HO(CH_2)_nOH$, where $n$ is an integer of from 2 to 10. Copolyesters can also be used in this invention and may comprise ethylene terephthalate-ethylene isophthalate copolyesters and other fiber forming copolyesters as more fully described hereinafter.

In producing polyester resins such as, for example, polyalkylene terephthalates, there is involved the interaction of about two molecular proportions of a glycol (preferably ethylene glycol) per molecular proportion of terephthalic acid with the splitting out of water. Subsequent heating of the resulting glycol ester of terephthalic acid at about 250° to 280° C. under 0.05 to 20 millimeters of mercury pressure absolute results in the production of high polymer with the splitting out of glycol which is removed from the reaction mixture.

Highly polymeric polyalkylene terephthalates, useful for the purpose of the invention, may be produced by heating terephthalic acid bodies, such as ester forming derivatives of terephthalic acid with at least one glycol. Suitable ester forming derivatives are aliphatic or aromatic esters of terephthalic acid such as $C_1$ to $C_4$ alkyld esters and/or aryl esters such as those from phenol and the like. The preferred derivatives are dimethyl and diethyl terephthalates.

In this procedure first there is a transesterification reaction (or ester interchange reaction) to the corresponding glycol esters at about 175° to 250° C. for 0.5 to 3.0 hours with the evolution of alcohol. Subsequently, upon heating at about 250° to 280° C. under 0.05 to 20 millimeters of mercury absolute pressure there is a polycondensation reaction for 0.2 to 8.0 hours to high polymer with splitting out (and removal) of glycol. Each reaction is preferably catalyzed. Zinc diacetate and other known catalysts are employed to speed up the transesterification reaction and antimony oxide or other known catalysts are employed to promote the subsequent polycondensation reaction.

The preparation of ethylene terephthalate-ethylene isophthalate copolyesters is also within the scope of the invention and is along the lines previously described. It is described in detail in U.S. Pat. 2,965,613 to Milone et al.

Representative examples of linear aromatic polyester resins useful for the purposes of the invention include, among others, not only polyethylene terephthalate and copolyesters of ethylene terephthalate and ethylene isophthalate, but also such polyesters as those of cyclohexane dimethanol terephthalate, polyethylene-2,6-naphthalate and copolyesters of ethylene glycol, polytetramethylene ether glycol and terephthalic acid containing from about 1 to about 10 mol percent of polytetramethylene glycol ether having a molecular weight of from about 1000 to 2000 and copolyesters of terephthalic acid which contain at least 75 mol percent of terephthalic acid. Also, copolyesters may be derived from a glycol, terephthalic acid and dimer acid as disclosed in U.S. Pat. 3,390,108 to Keck et al.

In accordance with the invention cationically dyeable polyesters are produced by incorporating into polyester fibers, filaments or fabrics 0.5 to 20 weight percent of the reaction product of dimer or trimer acid with the alkali metal salt of isethionic acid. These reaction products contain sulfonate groups and have a waxlike or resinous appearance. As is usual with sulfonate containing materials, they do not have sharp melting points, but on heating soften over a broad temperature range and eventually decompose.

The dimer acid and trimer acid used in the invention are prepared by dimerizing or trimerizing an unsaturated fatty acid containing 18 carbon atoms, such as linoleic or linolenic acid or a monohydric alcohol ester thereof. The preparation and structure of dimerized fatty acid is described in J.A.C.S. 66 94 (1944) and in U.S. Pat. 2,347,-562. The dimerized or trimerized acids are preferably reduced to saturate the carbon to carbon double bonds, although the unsaturated acids can be used if desired.

In preparing the products from dimer acid the materials are reacted in the ratio of 1 mol of dimer acid with from 1 to 2 mols of sodium salt of isethionic acid. In preparing the products from trimer acid the materials are reacted in the ratio of 1 mol of trimer acid to 1 to 3 mols of sodium salt of isethionic acid.

The preparation of the products is illustrated below. In all examples, parts or percentages are by weight unless otherwise indicated.

EXAMPLE 1

Into a two liter flask fitted with stirrer, thermometer and distillation accessories were charged 572 grams (1 mol) of dimer acid, 273 grams (1.85 mols) of the sodium salt of isethionic acid and 0.085 gram of manganese acetate. The mixture was heated and stirred for two hours, during which the temperature gradually rose from 150° C. (at which point stirring became possible) to 253° C. Considerable foaming took place starting at about 250° C. Heating and stirring were continued in the temperature range of 245 to 258° C. for an additional six hours, during which time the foaming gradually subsided, and 29 milliliters of distillate were obtained. The resulting pale yellow resinous appearing product was found to have a carboxyl number of 646. The product is primarily disodium diisethionic acid dimerate.

EXAMPLE 2

Into a two liter three neck flask fitted with stirrer, thermometer, and distillation head were charged 596 grams (1.042 mols) of dimer acid, 286 grams (1.928 mols) of isethionic acid (sodium salt, and 0.088 gram of manganese acetate.

In contrast to Example 1 the reaction was then carried out under vacuum. Thus when the reaction temperature had reached 107° C. the pressure on the system was reduced to 0.15 torr. The temperature was raised over a one hour period from 107° to 188° C., at which point the reaction mixture became clear. During the next two hours the temperature was raised from 188 to 228° C. At this higher temperature foaming became somewhat of a problem and it was necessary to increase the pressure to about 10 torr to control the level of foam in the flask. The mixture was heated an additional 1½ hours at 228 to 236° C., after which the pale yellow product was poured into a Teflon coated pan and allowed to cool and solidify. The carboxyl number was 628. The product is primarily disodium diisethionic acid dimerate.

EXAMPLE 3

In the manner described in Example 2 a reaction product was obtained by reacting dimer acid (1 mol) with the sodium salt of isethionic acid (2 mols). The carboxyl number of the pale yellow resinous solid was 838. The product is primarily disodium diisethionic acid dimerate.

EXAMPLE 4

In the manner described in Example 2 a reaction product was prepared in the absence of manganese acetate catalyst, one mol of dimer acid being reacted with 1.92 mols of the sodium salt of isethionic acid. The carboxyl number of this material is 516.

EXAMPLE 5

A one liter, three neck flask fitted with stirrer, thermometer, and distillation accessories was charged with 388 grams of dimethyl terephthalate, 50 grams of Polymeg 1000 (polytetramethylene ether glycol of 1000 molecular weight sold by the Quaker Oats Company), 286 grams of ethylene glycol, 0.1164 gram of manganese acetate and 0.1164 gram of antimony trioxide.

The mixture was heated with stirring over a temperature range of 145° to 212° C. until the evolution of methanol was complete. The resulting low molecular weight copolymer was then transferred in the molten state to a one liter glass autoclave. The temperature and vacuum were slowly increased so that after 1½ hours a temperature of 265° C. and a pressure of 0.6 torr were obtained. The reactor system was then restored to atmospheric pressure with nitrogen and 27 grams of the product of Example 1 were added. The system was then again placed under vacuum for 40 minutes while the temperature was raised from 268° to 281° C. The 97.5/2.5 ethylene/Polymeg 1000 terephthalate copolymer was then discharged from the reactor and characterized. The intrinsic viscosity was 0.551 and the DTA melting point was 253° C. The copolymer was ground, dried, and spun by conventional melt spinning process into yarn having a tenacity of 1.04 grams/denier and an elongation of 27.3 percent. The fibers were knitted into tubing form for dyeability tests. A swatch of this material was found to provide a medium depth of dye shade using Brilliant Red 3B without a carrier. With a carrier, a deep shade of dye uptake was obtained.

EXAMPLE 6

A 97.5/2.5 ethylene/Polymeg 1000 terephthalate copolymer was made by reacting 9.2 pounds of dimethyl terephthalate, 6.2 pounds of ethylene glycol, and 525 grams of Polymeg 1000 in the presence of 6.4 milliliters of a 6 percent solution of manganese octoate in mineral spirits and 1.136 grams of antimony trioxide. When a moderate molecular weight had been reached in the polymerizer the system was restored to atmospheric pressure with nitrogen and 204 grams of the product of Example 3 were added. The system was again placed under vacuum and polymerization was continued until an intrinsic viscosity of 0.619 was reached. This copolymer was ground, dried, and spun to provide a yarn having a tenacity of 3.33 grams/denier and an elongation of 36.4 percent and a shrinkage of 16 percent. Two samples of fabric knitted from this yarn were carrier dyed with Severon Brilliant Red 3B and with Basic Green No. 5 dye. Each sample dyed to a deep shade.

EXAMPLE 7

A 97/3 ethylene terephthalate/tertiarybutyl isophthalate copolymer was prepared by reacting 330 grams of dimethyl terephthalate, 286 grams of ethylene glycol, 0.100 gram of manganese diacetate, and 0.105 gram of antimony trioxide in the usual manner until the evolution of methanol was complete. Then 11.65 grams of tertiarybutyl isophthalic acid were added and the reaction was continued for three hours at 208° C. The resulting copolymer was transferred to the one liter glass autoclave and polymerized in the usual manner. When a moderate molecular weight had been reached in the polymerizer 7 weight percent (based on the dimethyl terephthalate used) of the product of Example 4 was added. Polycondensation was continued under vacuum until the intrinsic viscosity had reached 0.525. Fabric knitted from the spun fibers was carrier dyed with Severon Brilliant Red 3B dye. A deep shade of dye uptake was obtained.

Intrinsic viscosity as recorded for the resins is defined as limit $$\frac{\ln(\eta_r)}{C}$$

as $C$ approaches 0 in which $\eta_r$ is the viscosity of a dilute solution of the resin in a 60/40 phenol-tetrachloroethane solvent mixture divided by the viscosity of the solvent mixture in the same units at the same temperature. For the intrinsic viscosities reported in this specification a sufficient sample of each resin was dissolved in the solvent mixture to form a solution having a resin concentration of approximately 0.4 gram per 100 cubic centimeters of solution. The time of flow of each solution and of the solvent was measured in a No. 1 Ubbelohde Viscosimeter at 30.0° C. and these times were used in the respective viscosities in the equation above.

While certain representative embodiments and details have been shown for the purpose of illustrating the invention it will be apparent to those skilled in this art that various changes and modifications may be made therein without departing from the spirit or scope of the invention.

What I claim is:

1. A polyester of improved acceptance to basic dyes, said polyester having been mixed during polycondensation with about 0.5 to 20 weight percent of at least one material selected from the group consisting of (A) the reaction product of a dimer of an unsaturated fatty acid containing 18 carbon atoms or a monohydric alcohol ester thereof with the alkali metal salt of isethionic acid, and (B) the reaction product of a trimer of an unsaturated fatty acid containing 18 carbon atoms or a monohydric alcohol ester thereof with an alkali metal salt of isethionic acid.

2. The polyester of claim 1 in which the polyester is a fiber forming copolyester.

3. The copolyester of claim 2 which is a copolyester containing ethylene glycol, polytetramethylene glycol ether and terephthalic acid and which contains from about 1 to about 10 mol percent of polytetramethylene glycol ether having a molecular weight of from about 1000 to about 2000.

4. The polyester of claim 1 in which the polyester is poly(1,4-cyclohexane dimethylene) terephthalate.

5. The polyester of claim 1 in which the polyester is poly(ethylene terephthalate).

6. The polyester of claim 1 containing 1 to 15 weight percent of the reaction product of a dimer of an unsaturated fatty acid containing 18 carbon atoms or a monohydric alcohol ester thereof with the sodium salt of isethionic acid.

7. The polyester of claim 1 in which there is incorporated into the polymer 3 to 7 weight percent of the reaction product of a trimer of an unsaturated fatty acid containing 18 carbon aoms or a monohydric alcohol ester thereof with the sodium salt of isethionic acid.

8. The polyester of claim 1 in the form of an oriented fiber.

9. The polyester of claim 3 in the form of a dyed fiber.

10. The polyester of claim 5 in the form of a dyed fiber.

References Cited
UNITED STATES PATENTS

| | | | |
|---|---|---|---|
| 3,018,272 | 1/1962 | Griffing et al. | 260—75 |
| 3,314,920 | 4/1967 | Sakurai et al. | 260—75 |
| 3,390,108 | 6/1968 | Keck et al. | 260—7.5 |

DONALD E. CZAJA, Primary Examiner

R. W. GRIFFIN, Assistant Examiner

U.S. Cl. X.R.

8—168; 260—75 S, 399